(12) United States Patent
Subramanian et al.

(10) Patent No.: US 11,348,069 B2
(45) Date of Patent: May 31, 2022

(54) SYSTEM, METHOD, AND DEVICE FOR ELECTRONICALLY PROVIDING PAVING INFORMATION

(71) Applicant: Caterpillar Inc., Peoria, IL (US)

(72) Inventors: Gautham Subramanian, Peoria, IL (US); John Marsolek, Watertown, MN (US); Jacob McAlpine, Otsego, MN (US)

(73) Assignee: Caterpillar Inc., Peoria, IL (US)

( * ) Notice: Subject to any disclaimer, the term of this patent is extended or adjusted under 35 U.S.C. 154(b) by 42 days.

(21) Appl. No.: 16/888,411

(22) Filed: May 29, 2020

(65) Prior Publication Data

US 2021/0374676 A1    Dec. 2, 2021

(51) Int. Cl.
*G06Q 10/10*      (2012.01)
*G06F 3/04842*    (2022.01)
*G06Q 50/08*      (2012.01)
*G06Q 10/08*      (2012.01)

(52) U.S. Cl.
CPC ....... *G06Q 10/103* (2013.01); *G06F 3/04842* (2013.01); *G06Q 10/087* (2013.01); *G06Q 50/08* (2013.01)

(58) Field of Classification Search
None
See application file for complete search history.

(56) References Cited

U.S. PATENT DOCUMENTS

| | | | |
|---|---|---|---|
| 9,165,330 B2 | 10/2015 | Ueda et al. | |
| 9,341,480 B2 | 5/2016 | Sugihara et al. | |
| 10,559,208 B1* | 2/2020 | McAlpine | E01C 19/288 |
| 2002/0188530 A1* | 12/2002 | Wojcik | G06Q 30/04 |
| | | | 705/28 |
| 2007/0260379 A1* | 11/2007 | Congdon | E01C 21/00 |
| | | | 701/50 |
| 2010/0138266 A1* | 6/2010 | Nichols | G06Q 10/087 |
| | | | 705/7.23 |

(Continued)

FOREIGN PATENT DOCUMENTS

| | | |
|---|---|---|
| AU | 2012265613 A1 | 1/2013 |
| CN | 109685436 A | 4/2019 |

OTHER PUBLICATIONS

CAT® eROUTES, A Plant-to-Paver, Process-Monitoring Solution for Peak Efficiency & Maximum Productivity, available at, https://s7d2.scene7.com/is/content/Caterpillar/CM20200129-ffbd0-4bc15 (last accessed May 29, 2020).

*Primary Examiner* — Henry Orr
(74) *Attorney, Agent, or Firm* — Xsensus LLC

(57) ABSTRACT

A system, method, and device for electronically providing paving information for paving quality and control actions comprises receiving paving information at a first computer or processor, which can host an application to perform some or all of the paving quality and control actions. The paving information can include one or more electronic work tickets associated with respective paving material dump spots. The paving information can be displayed on a display if an electronic device associated with the first computer or processor. The first computer or processor can also receive paving quality and control information responsive to one or more inputs to the electronic device. The paving quality and control information can be output to another electronic device for consideration.

17 Claims, 18 Drawing Sheets

(56) References Cited

U.S. PATENT DOCUMENTS

| | | | |
|---|---|---|---|
| 2012/0288328 A1* | 11/2012 | Minich | E01C 19/004 404/72 |
| 2013/0184938 A1* | 7/2013 | Dolinar | G06K 9/00791 701/41 |
| 2017/0205814 A1* | 7/2017 | Marsolek | G05B 19/41895 |
| 2017/0228108 A1 | 8/2017 | Marsolek | |
| 2018/0073208 A1 | 3/2018 | Wilson et al. | |
| 2019/0186094 A1 | 6/2019 | Marsolek et al. | |
| 2019/0188620 A1* | 6/2019 | Marsolek | G06Q 10/06315 |
| 2020/0256976 A1* | 8/2020 | Roberts | G01S 13/865 |
| 2020/0292348 A1* | 9/2020 | Chambers | G06F 30/10 |

* cited by examiner eRoutes

Tickets 1

PROJECT DASHBOARD | DATA MANAGEMENT | ADMINISTRATION

Tickets

Q Search  ▽ Add Filter  (UTC+05:30) Chennai,... ▽  This Week ▽

Schedule Report

| Plant ID | Truck ID | Ticket Number | | Ticket Date/Time | Net Weight (US Tons) | Project ID | Project Name | Material ID |
|---|---|---|---|---|---|---|---|---|
| MYOFC | DI | 20APR04$004 | | 04/02/20 15:30:00 | 43.1 | MYOFC | AGE | MYOFC |
| MYOFC | CL | 20APR04$003 | | 04/02/20 15:48:00 | 43.1 | MYOFC | BARBARIYAN | MYOFC |
| MYOFC | CL | 20APR04$002 | | 04/02/20 16:18:00 | 43.1 | MYOFC | BARBARIYAN | MYOFC |
| MYOFC | CL | 20APR04$001 | | 04/02/20 10:30:00 | 43.1 | MYOFC | JUDGEMENT | MYOFC |

Contact Us   Legal

SYSTEM, METHOD, AND DEVICE FOR ELECTRONICALLY PROVIDING PAVING INFORMATION

TECHNICAL FIELD

The present disclosure relates to electronically providing worksite servicing information, and more particularly relates to electronically providing paving information for quality and control operations.

BACKGROUND

Conventionally, a worksite contractor and a quality inspection/regulating entity (e.g., any entity, such as a private or governmental agency, authorized to inspect/regulate a worksite) may need to coordinate for a quality and control inspection performed by the quality inspection/regulating entity. Oftentimes this process involves a work ticket physically provided from the contractor to the quality inspection/regulating entity who then performs the quality inspection in association with the physical work ticket.

U. S. Patent Pub. No. 2017/0228108 ("the '108 publication") describes a process management tool for paving operations. The process management tool includes a communication device configured to receive data messages associated with a worksite, a display device, and an input device configured to receive user inputs. The process management tool also includes a processor in communication with the communication device, the display device, and the input device, that is configured to generate an interactive map of the worksite on the display device. According to the '108 publication, the interactive map includes a plurality of map sections selectable via the input device, where each map section is associated with respective paving process data.

SUMMARY OF THE DISCLOSURE

In one aspect, the present disclosure implements an inspection method comprising: receiving paving information at a first mobile device hosting an application to perform paving quality and control operations, the paving information including a bundle of electronic work tickets associated with respective paving material dump spots; providing, using the application hosted on the first mobile device, a graphical user interface (GUI) on a display of the first mobile device to selectively display portions of the paving information responsive to user input at the graphical user interface; and recording, using the application hosted on the first mobile device, paving quality and control information responsive to user input to the graphical user interface. The paving quality and control information can include a requirement for additional information and/or a requirement for action to be taken at one or more of the paving material dump spots.

In another aspect, the present disclosure implements or provides a non-transitory computer-readable storage medium storing computer-readable instructions that, when executed by one or more computers, cause the one or more computers to perform a method. The method can comprise: receiving paving information at a first computer of the one or more computers, which is hosting an application to perform paving quality and control operations, the paving information including one or more electronic work tickets linked to respective paving material dump spots; providing, using the application hosted on the first computer, a graphical user interface (GUI) on a display to display the paving information responsive to an input at the graphical user interface; and receiving, using the application hosted on the first computer, paving quality and control information responsive to input to the graphical user interface. The paving quality and control information can be a characterization of paving material at one or more of the paving material dump spots. The paving information can include a location of the paving material dump spot, a date and time of creation of the paving material dump spot, an electronic ticket identifier, a haul truck identifier, a customer identifier associated with the haul truck, a paving material identifier, a paving material plant identifier associated with the paving material, and/or a weight of the paving material provided at the paving material dump spot.

In yet another aspect a system for locally troubleshooting a work machine can be provided or implemented. The system can comprise: a first communication circuitry of a paving machine; a back office system; a first mobile device hosting an application to perform paving quality and control operations by an operator of an authorized inspection/regulating entity; a first communication network accessible by and providing a communication link between the back office system and the first communication circuitry; and a second communication network accessible by and providing a communication link between the first mobile device and the back office system, the second communication network being a wireless communication network. The back office system can provide to the first mobile device paving information regarding electronic work tickets associated with respective paving material dump spots at a worksite. The application hosted on the first mobile device can provide a graphical user interface (GUI) on a display of the first mobile device to selectively display portions of the paving information corresponding to a specific one of the electronic work tickets responsive to an input at the graphical user interface from the operator of the authorized inspection/regulating entity requesting paving information for the specific one of the electronic work tickets. The first mobile device can provide to the back office system paving quality and control information input by the operator of the authorized inspection/regulating entity using the graphical user interface provided by the application hosted on the first mobile device.

Other features and aspects of this disclosure will be apparent from the following description and the accompanying drawings.

BRIEF DESCRIPTION OF THE DRAWINGS

Figure 14:
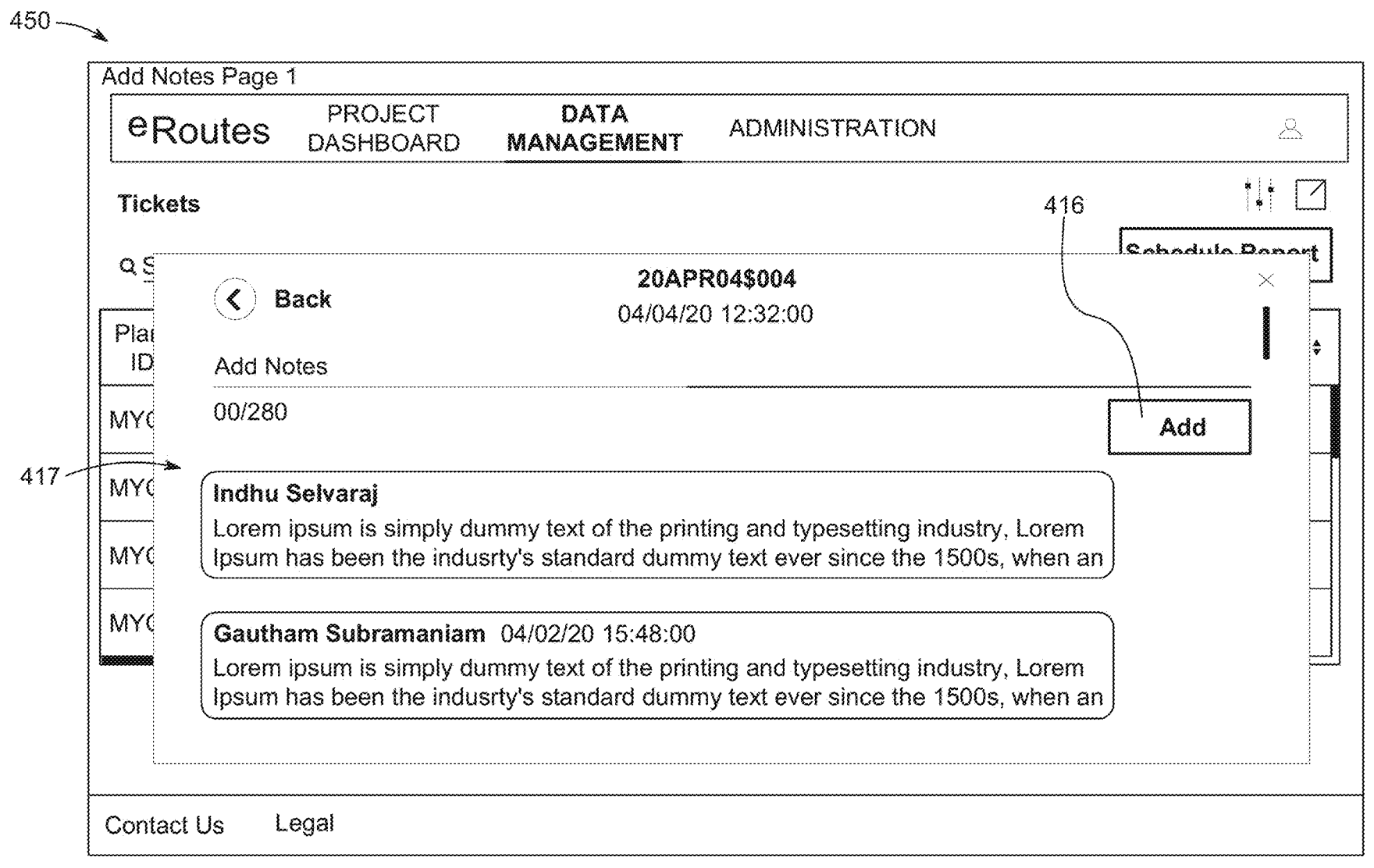

FIGS. 12-16 are images of an exemplary graphical user interface that may be generated according to embodiments of the disclosed subject matter.

DETAILED DESCRIPTION

The present disclosure relates to electronically providing worksite servicing information, and more particularly relates to electronically providing paving information for quality and control operations. Though embodiments of the disclosed subject matter may be described as pertaining specifically to paving operations, embodiments of the disclosed subject matter may not be so limited, and may be applicable in other worksite contexts.

Figure 1:
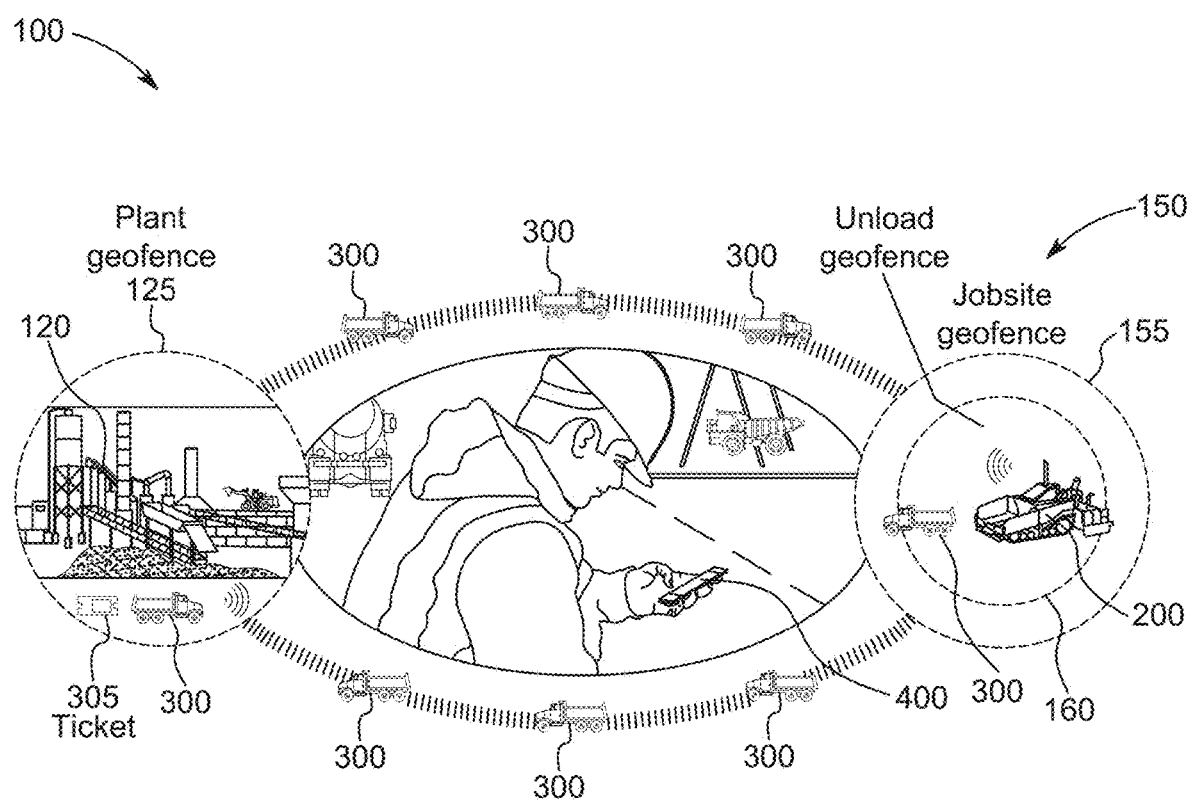
FIG. 1 illustrates an exemplary environment regarding embodiments of the disclosed subject matter.

FIG. 1 illustrates an exemplary environment 100 regarding embodiments of the disclosed subject matter.

The environment 100 may include a plant 120 and a jobsite or worksite 150. The environment 100 can also include at least one paving machine or paver 200 and one or more hauling machines 300, which may be haul trucks. The plant 120 may be defined by a virtual boundary or geofence 125. Likewise, the worksite 150 may be defined by a virtual boundary or geofence 155. The geofence 155 for the worksite 150 may be stationary or, alternatively, movable with the paving machine 200 as the paving machine 200 moves along the roadway.

Generally, the hauling machines 300, which can have circuitry to continuously or intermittently transmit position information (e.g., GPS data), can move between the plant 120 and the worksite 150 to bring road surface or paving material (e.g., asphalt, mixed asphalt, etc.) to the worksite 150. More specifically, the hauling machines 300 can be filled with paving material at the plant 120 and haul the paving material to the paving machine 200 to load the paving machine 200 with the paving material. Discussed in more detail below, a mobile unload virtual boundary or geofence 160 may be provided around the paving machine 200 and may identify a boundary for unloading the paving material from the hauling machines 300 to the paving machine 200.

Each time a hauling machine 300 is loaded with paving material and leaves from the plant 120 a work ticket 305 may be generated. Such ticket may be in the form of an electronic work ticket 305, and may include an electronic work ticket identifier (e.g., number) associated with information regarding work performed by the hauling machine 300. One electronic work ticket 305 may correspond to one work cycle of one of the hauling machines 300, and hence may correspond to a single paving material dump spot at which paving material is transferred from the hauling machine 300 to the paving machine 200. Such work information can include an identifier of the plant 120, an identifier of the hauling machine 300, a project identifier (e.g., name, worksite, etc.), a customer identifier, a paving material identifier (e.g., identification number and/or material name), a weight of the paving material added to the hauling machine 300 (e.g., net weight, gross weight, and/or tare rate), a load identifier (e.g., load number), date and/or time of creation of the paving material added to the hauling machine 300, and/or day and time hauling machine 300 leaves the plant 300 toward the worksite 150.

The electronic work ticket 305 may be generated by an operator or administrator of the plant 120. Optionally, the electronic work ticket 305 may be updated after initial generation, for instance, to include additional work information, such as time of arrival at the worksite 150, time of providing the paving material to the paving machine 200, and/or location of providing the paving material to the paving machine 200 (i.e., dump spot location). Such updating may be done by an operator or administrator of the worksite 150, for instance. The electronic work ticket 305 may also be accessed and updated with quality and control information by a quality inspection/regulating entity authorized to conduct an inspection of the paving material at the worksite 150, particularly after the paving material has been applied by the paving machine 200. It may be necessary to prove authorization to update with quality and control information via an electronic authentication process (e.g., logging in, credentialing, etc.)

The environment 100 may also include one or more electronic devices 400. Some, none, or all of the electronic devices 400 may be mobile electronic devices, such as a smart phone, a tablet, or a personal digital assistant (PDA). Additionally or alternatively, some, none, or all of the electronic device 400 may be stationary electronic devices, such as personal computers (PCs).

The electronic devices 400 can run an application, mobile or non-mobile (e.g., web-based computer software program) depending upon the type of electronic device 400, according to embodiments of the disclosed subject matter. Optionally, the application can be subscription-based. Discussed in more detail below, the electronic devices 400 can, when running the application, electronically provide paving information regarding paving material at a number of different locations within the worksite 150. Such paving information can be used to perform quality and control operations regarding the paving material.

Operators of the electronic devices 400 can be a contractor, or employee thereof, overseeing the project, for instance, at or remote from the worksite 150, as well as an agent (e.g., employee) of a quality inspection/regulating entity authorized to conduct an inspection of the paving material. For instance, the contractor may provide paving information or have paving information provided so as to be accessible by an electronic device 400 operated by the quality inspection/regulating entity. Generally, the electronic device 400 can be used by the quality inspection/regulating entity, as part of an inspection, to analyze the paving information and, if desired, provided feedback regarding the paving material. Such feedback may be linked or associated with the electronic work ticket 305. Discussed in more detail below, such feedback may include notes commenting on or characterizing the paving material and/or sampling data (e.g., images, temperature, etc.) from the paving material forming the basis of the inspection. Optionally, the electronic device 400 used by the quality inspection/regulating entity may be provided in or part of a data collection vehicle.

Figure 2:
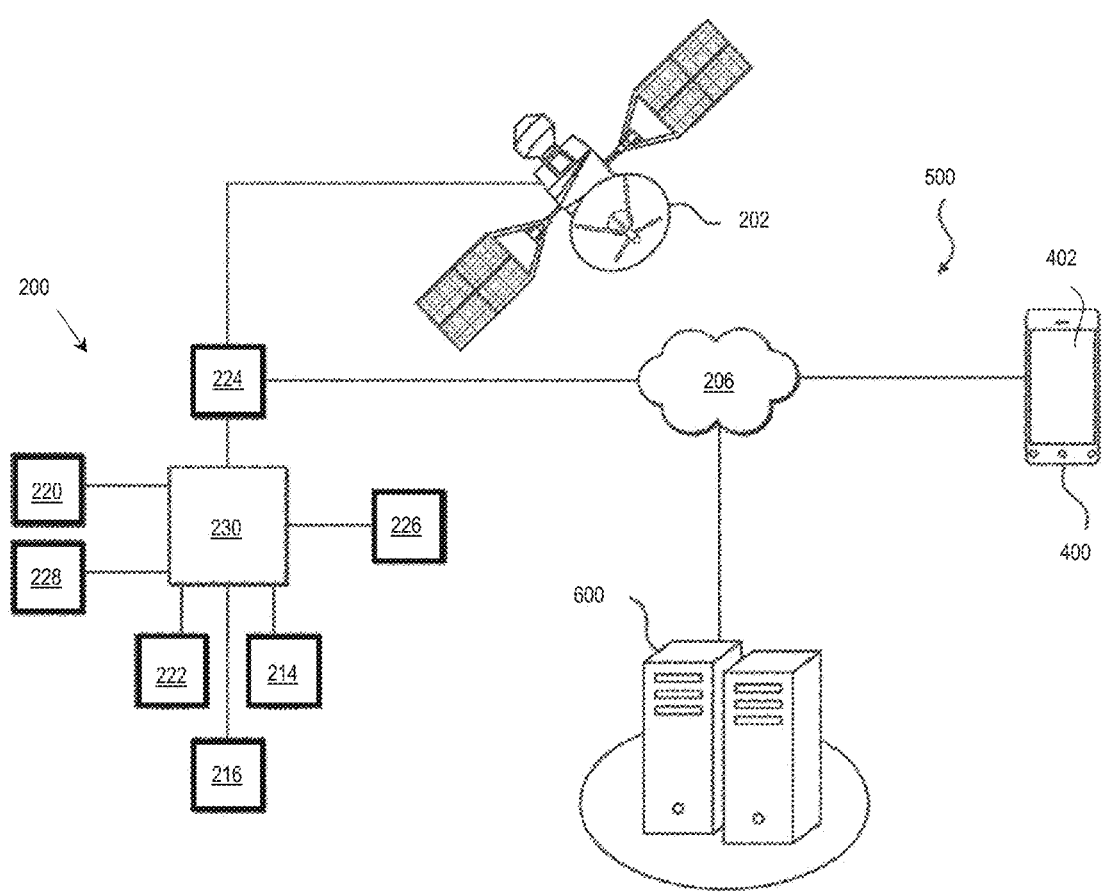
FIG. 2 is a block diagram schematically representing a system according to embodiments of the disclosed subject matter.

FIG. 2 is a block diagram schematically representing a system 500 according to embodiments of the disclosed subject matter. The system 500 can include one or more of the electronic devices 400 and a back office system 600. The system 500 may also include the paving machine 200.

The paving machine 200 can include at least one controller 230, a steering system 220, a control interface 222, a location sensor 224, a communication device or entity 226 (e.g., communication circuitry, logic, interface, etc.), a camera 228, one or more sensors 214, 216, and/or any other sensors or components of the paving machine 200; the controller 230 may receive respective signals from such components. For example, the controller 230 may receive one or more signals from the location sensor 224 including information indicating a location of the paving machine 200. In some examples, the location sensor 224 may determine the location of the paving machine 200 as the paving machine 200 traverses the worksite 150. The location sensor 224 may also be used to set the unload geofence 160.

As shown in FIG. 2, the location sensor 224 may be connected to and/or otherwise in communication with one or more satellites 202 or other GPS components to assist the location sensor 224 in determining the location of the paving machine 200. In some examples, such satellites 202 or other GPS components may comprise components of the system 500. The location sensor 224, either alone or in combination with the satellite 202, may provide the controller 230 with signals including information indicative of the location of the paving machine 200 and/or other information. Such information may be determined substantially continuously during movement of the paving machine 200. Alternatively, such information may be determined at regular time intervals (milliseconds, one second, two seconds, five seconds, ten seconds, etc.) as the paving machine 200 travels. Any such information may be stored in a memory associated with the controller 230. Such memory may be disposed on the paving machine 200 and/or may be located in the cloud, on a server, and/or on any other electronic device located remote from the paving machine 200.

The controller 230 may also receive respective signals from the sensors 214, 216. Sensor 214 may determine a paving width for operations of the paving machine 200, for instance, based on width settings of a screed of the paving machine 200. That is, sensor 214 (which may include multiple sensors) can sense paving width dimensions of the screed of the paving machine 200 to determine paving width. The controller 230 may determine when the paving machine 200 is in a pave "on" mode based on operational characteristics of the paving machine 200, such as whether moving, speed, etc., and record the width settings of the screed when the paving machine 200 is in the "on" mode (and hence paving). Likewise, sensor 216 may determine a paving height or depth for operations of the paving machine 200. Sensor 216 may thus include one or more sensors (e.g., sonics, pads, and/or cameras) to determine paving depth. The controller 230 may determine when the paving machine 200 is in a pave "on" mode based on operational characteristics of the paving machine 200, such as whether moving, speed, etc., and record the depth measurements when the paving machine 200 is in the "on" mode (and hence paving).

The paving width and/or paving depth data may be collected onboard the paving machine 200, for instance, using the controller 230, and may be correlated with position data of the paving machine 200 from the location sensor 224. The data may then be outputted electronically in bundled or unbundled form, from the paving machine 200, via the communication device 226, to one or more of the electronic devices 400 and/or the back office system 600. Such data may be used to provide paving progress information, for instance, paving width and/or paving depth in conjunction with a particular interval or intervals or roadway. Moreover, such data may be used to confirm paving progress according to distance, width, and/or paving depth regulations or requirements, according to inspection by the quality inspection/regulating entity, using the electronic device 400 having the application according to embodiments of the disclosed subject matter running thereon.

As noted above, the system 500 may also include the back office system 600, which may be comprised of one or more remote servers, processors, or other such computing devices. Such computing devices may comprise, for example, one or more servers, laptop computers, or other computers located at a location remote from the worksite 150. In such examples, the communication device 226 and/or the controller 230 may be connected to and/or otherwise in communication with the back office system 600 via a network 206.

The network 206 may be a local area network ("LAN"), a larger network such as a wide area network ("WAN"), or a collection of networks, such as the Internet. Protocols for network communication, such as TCP/IP, may be used to implement the network 206. The network 206 may be referred to herein as a first communication network, and may be a wireless communication network. The network 206 may also be representative of a communication network between the one or more electronic devices 400 and the back office system 600. Such network may be referred to herein as a second communication network, and may be a wireless communication network. Optionally, network 206 may be referred to as "the cloud," where paving data from the paving machine 200 can be received by the cloud and sent to or otherwise accessed by the back office system 600. Likewise, paving information from the back office system 600 can be received by the cloud and sent to or otherwise accessed by the one or more electronic devices 400. Moreover, information provided at one or more of the electronic devices 400, such as paving quality and control information, can be sent from the one or more electronic devices 400 to the cloud and then sent to or otherwise accessed by the back office system 600.

As noted above, the electronic devices 400 can run an application, mobile or non-mobile (e.g., web-based computer software program) depending upon the type of electronic device 400. The electronic devices 400 can, while running the application, electronically provide paving information regarding paving material at a number of different locations within the worksite 150 (e.g., paving material dump spots). Such paving information can be provided on a display 402 of the electronic device 400. Optionally, the application can generate a graphical user interface (GUI) on the display 402 of the electronic device 400 to provide the paving information.

FIGS. 3-11 are images of an exemplary graphical user interface 410 that may be generated, using the application running on the electronic device 400, and based on paving information, for instance, from the back office system 600, according to embodiments of the disclosed subject matter.

Figure 3:
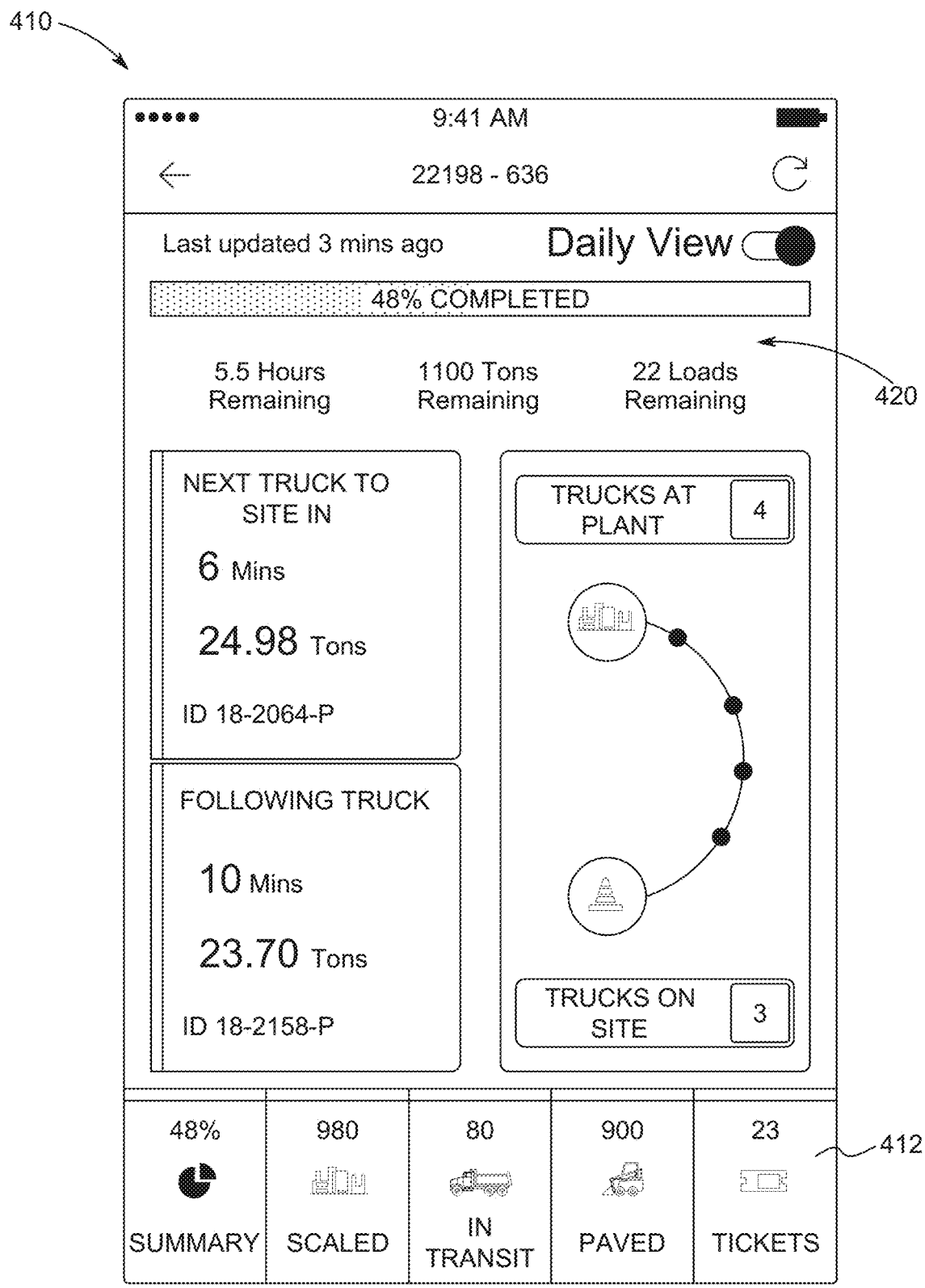
FIGS. 3-11 are images of an exemplary graphical user interface that may be generated according to embodiments of the disclosed subject matter.
Figure 4:
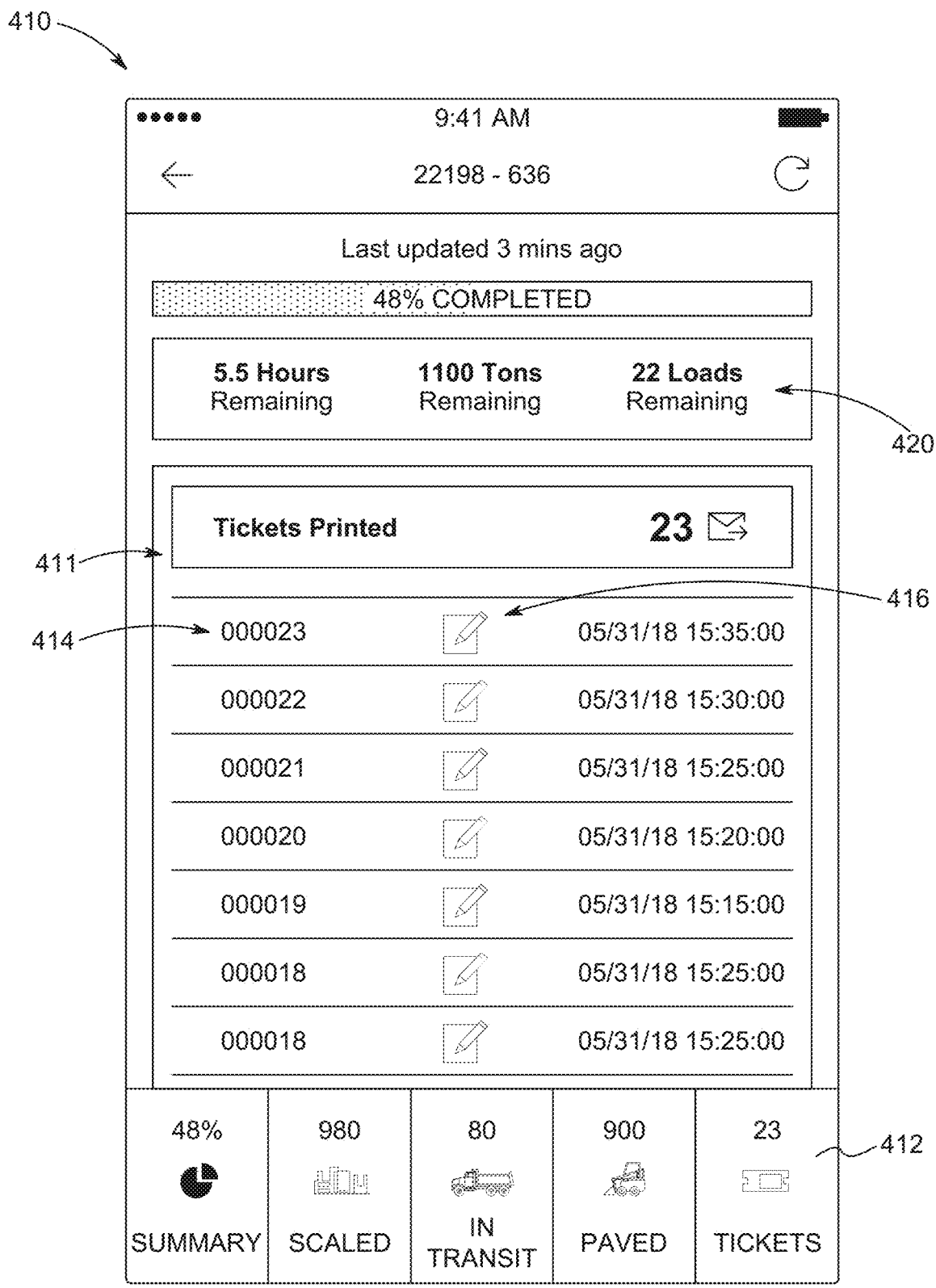

Generally, the graphical user interface 410 can be a progress monitoring tool to monitor progress of paving at the worksite 150, along with counterparts to the paving such as operations at the plant 120 and the hauling machines 300. Such tool may be accessed by a contractor, or employee thereof, overseeing the project, for instance, at or remote from the worksite 150, as well as an agent (e.g., employee) of a quality inspection/regulating entity authorized to conduct an inspection of the paving material. In some instances, access may be selectively granted to a particular user. For instance, only the quality inspection/regulating entity may be allowed to provide feedback (e.g., notes) regarding paving quality and control information. As another example, optionally, only the quality inspection/regulating entity may be able to clear a flag or other quality indicator upon taking a successful remedial action to address an initial issue flagged by the quality inspection/regulating entity. The graphical user interface 410 can display paving progress information 420, such as shown in FIG. 3 and FIG. 4.

Figure 5:
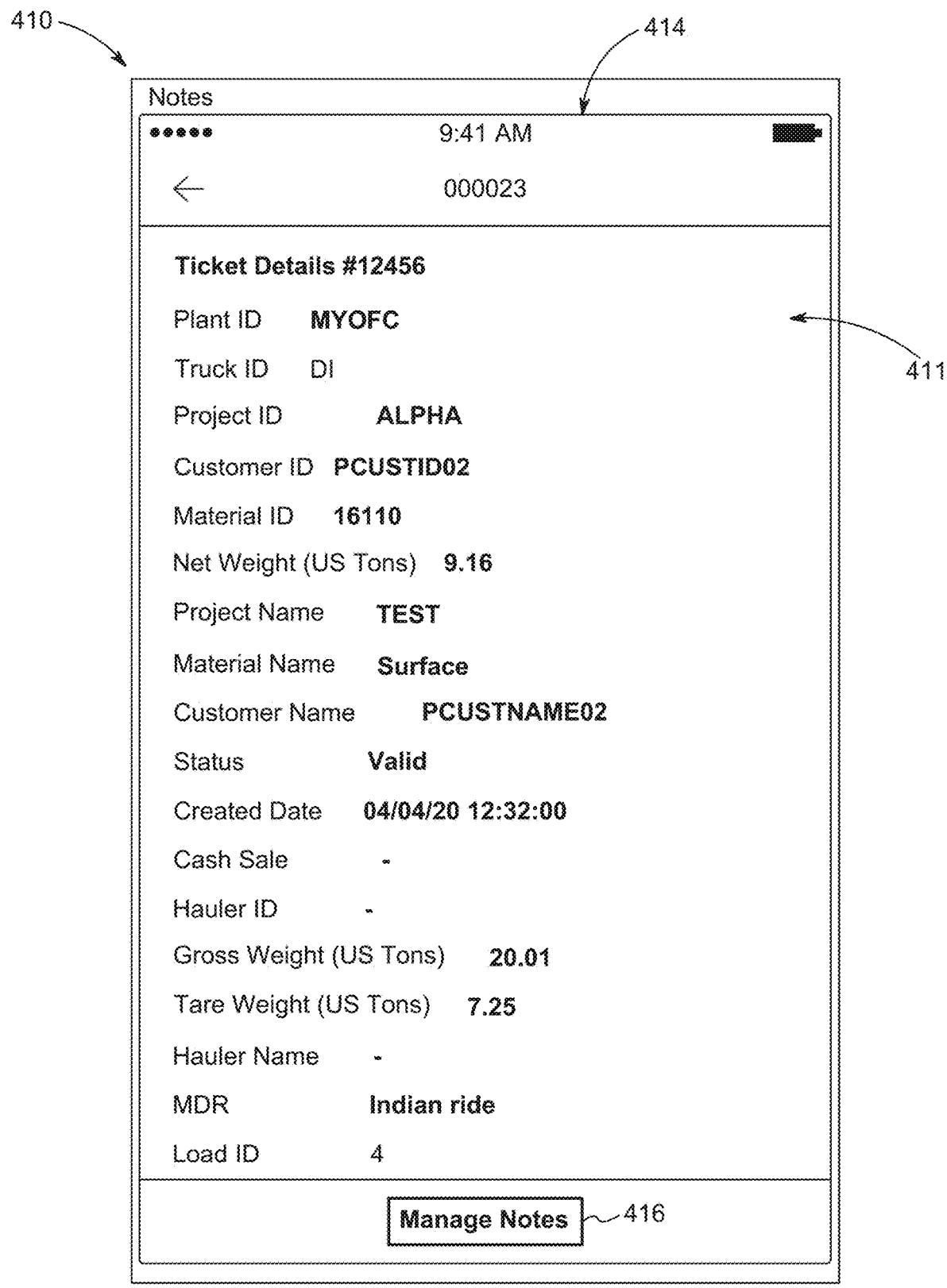
Figure 6:
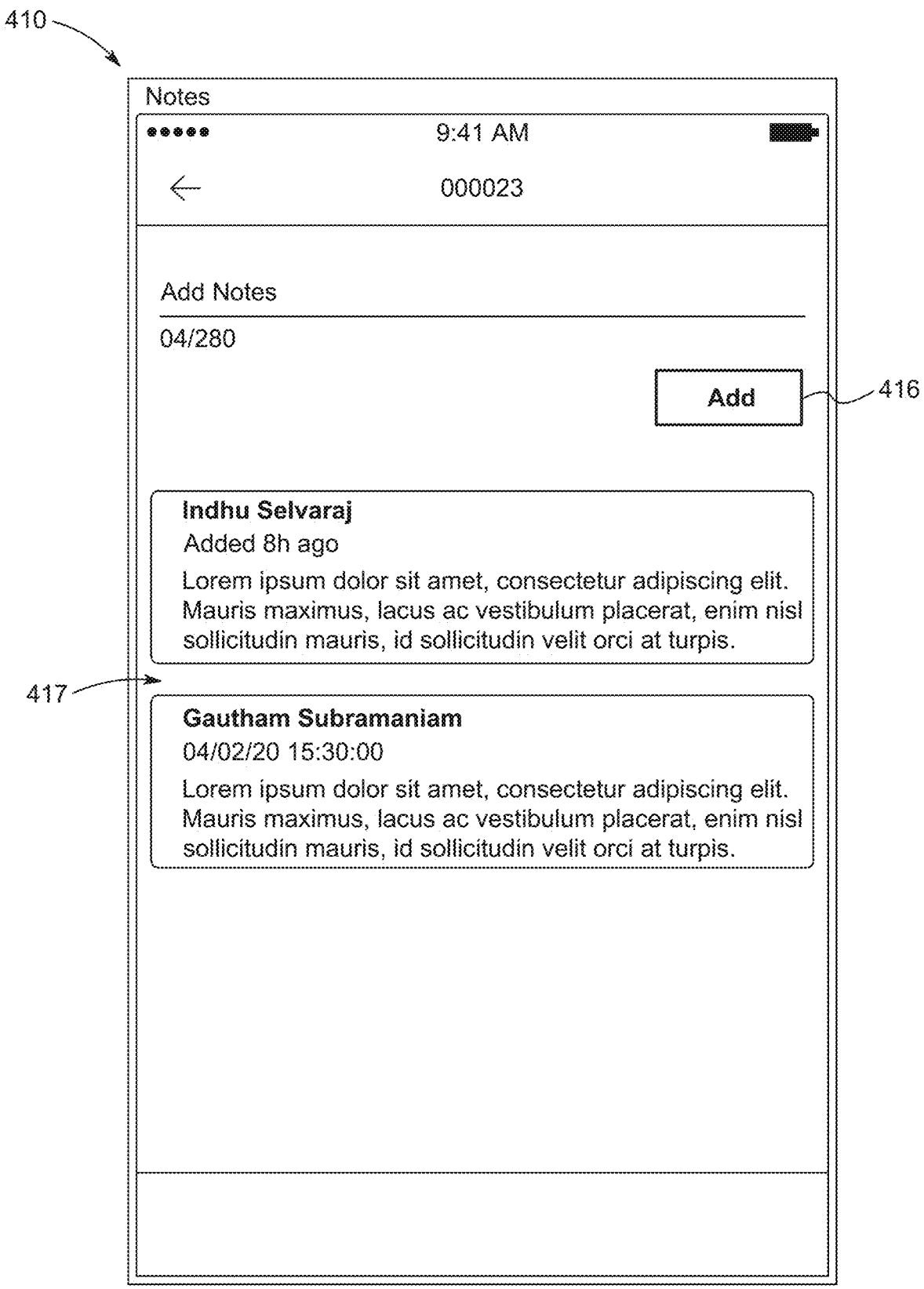
Figure 7:
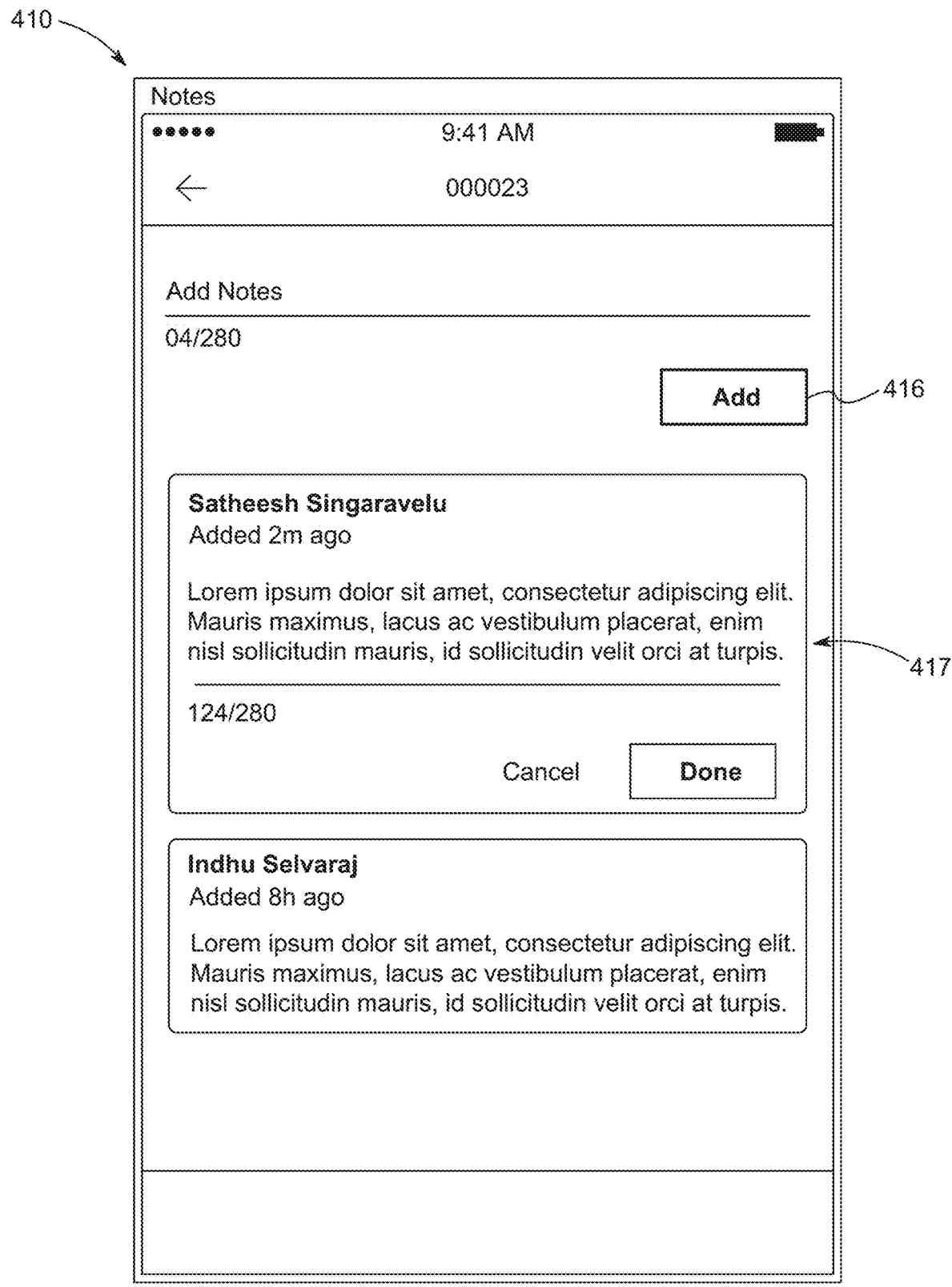

The graphical user interface 410 can include a work ticket input (e.g., an icon) 412 to access electronic work ticket information. Optionally, selection of the work ticket input 412 in FIG. 3 can result in the image shown in FIG. 4. As shown in FIG. 4, this image can provide work ticket information, such as number of electronic work tickets 305 printed and work ticket identifiers 414. Work ticket identifiers 414 may be in the form of numbers, such as shown, but are not so limited. Moreover, the work ticket identifiers 414 may be provided in association with other work ticket information, such as a day and time of generation. The work ticket identifiers 414 may be active links, meaning that activation (i.e., selection by providing an input to the graphical user interface 410) of a particular work ticket identifier 414 can result in the graphical user interface 410 providing additional information regarding the electronic work ticket 305 associated with the selected work ticket identifier 414. FIG. 5 shows an example of additional information that may be provided regarding the selected work ticket identifier 414. More generally, paving information 411 associated with each electronic work ticket 305 may include, for each paving material dump spot, location of the paving material dump spot, a date and time of creation of the paving material dump spot, an electronic ticket identifier, a haul truck identifier, a customer identifier associated with the haul truck, a paving material identifier, a paving material plant identifier associated with the paving material, and/or a weight of the paving material provided at the paving material dump spot.

Quality and control inputs (e.g., icons) 416 may be provided in association with some or all of the work ticket identifiers 414. Such quality and control inputs 416 may be to add quality and control information for the electronic work tickets 305. Quality and control information may be added upon physical inspection of the paving material at the worksite 150 and/or upon review of the work ticket information provided in FIG. 5, for instance. Alternatively, such quality and control inputs 416, when shown, may indicate that a particular electronic work ticket 305 has associated quality and control information (i.e., has already been added). In this latter scenario, a non-quality inspection entity (e.g., a contractor) responsible for the paving operation may access the added quality and control information. Optionally, the non-quality inspection entity may provide information in response to the quality and control information, such as an answer to an inquiry or that an identified quality issue has been rectified.

Figure 8:
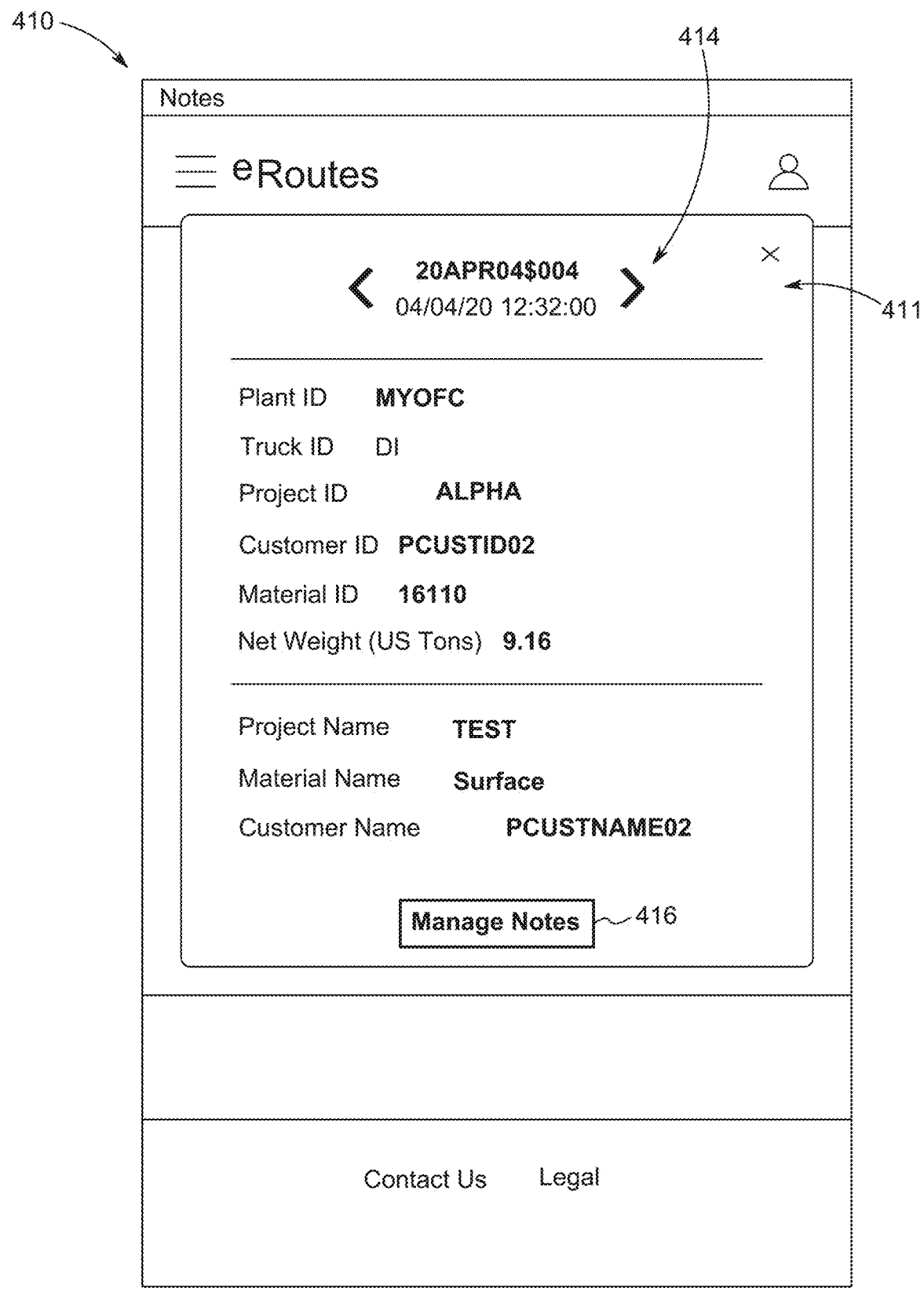
Figure 9:
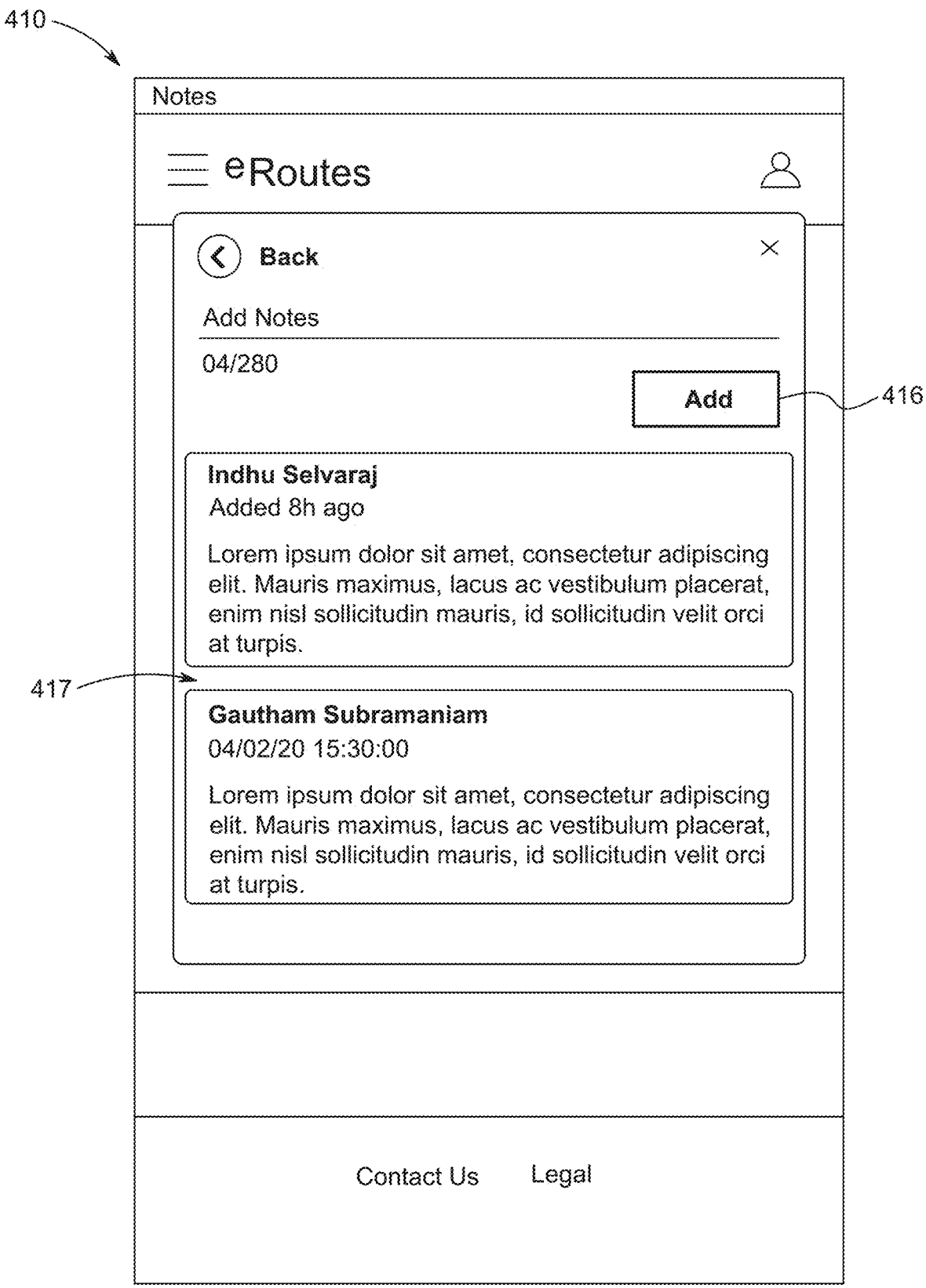
Figure 10:
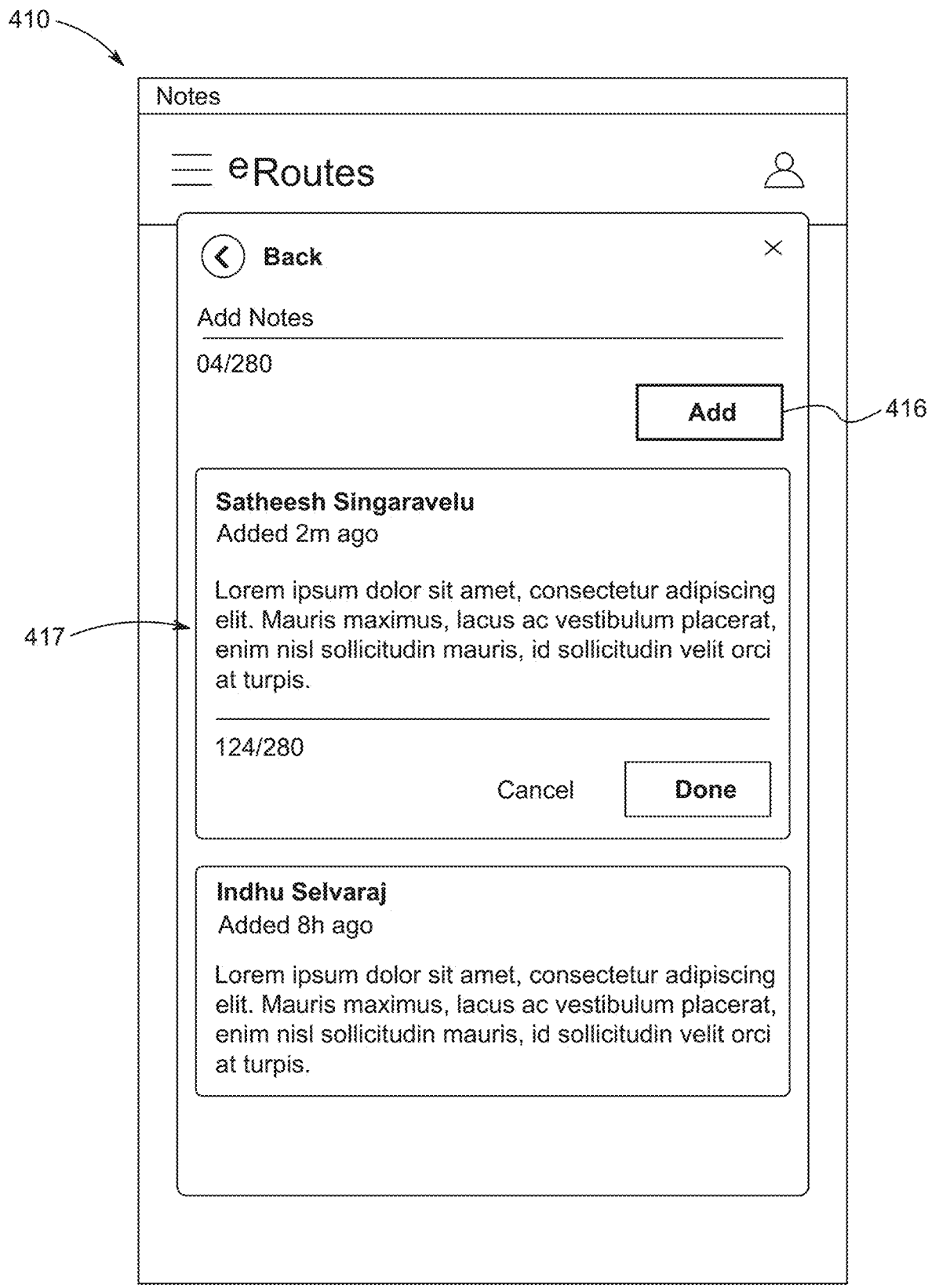

The quality and control input 416 may be shown differently when work ticket information is shown for a particular electronic work ticket 305, such as shown in FIG. 5. Selection of the quality and control input 416 in FIG. 5 can result in the sequence of images of FIG. 6 and FIG. 7 to add paving quality and control information 417. The addition of paving quality and control information 417 using graphical user interface 410 can result in such information being provided to the back office system 600. Thus, the quality inspection/regulating entity can send to a party or parties responsible for the paving operation, via the back office system 600, for instance, quality and control information 417 in association with a particular electronic work ticket 305. FIGS. 8-10 show alternative counterparts to FIGS. 5-7, respectively.

Paving quality and control information 417 can be a characterization of the paving operation at one or more of the paving material dump spots. For instance, the characterization may be relative to a characteristic of the paving material, such as the consistency, temperature, etc. of the paving material. Optionally, the paving quality and control information 417 can be a requirement for additional information and/or an action to be taken regarding one or more of the paving material dump spots. Additionally or alternatively, the paving quality and control information 417 may be or include data corresponding to an electronically captured image and/or temperature of the paving material. That is, rather than or in addition to entering a word-based description of the paving quality and control information 417, the electronic device 400 can capture paving material information directly as the paving quality and control information, where such paving material information can be sent to the back office system 600, for instance, for further analysis to assess the quality and control issue identified using the electronic device 400 at the worksite 150. The electronic device 400 can directly capture paving material information using a camera to capture images of the paving material and/or temperature capture device to obtain temperature of the paving material and/or using a laser to capture temperature data of the paving material.

Figure 11:
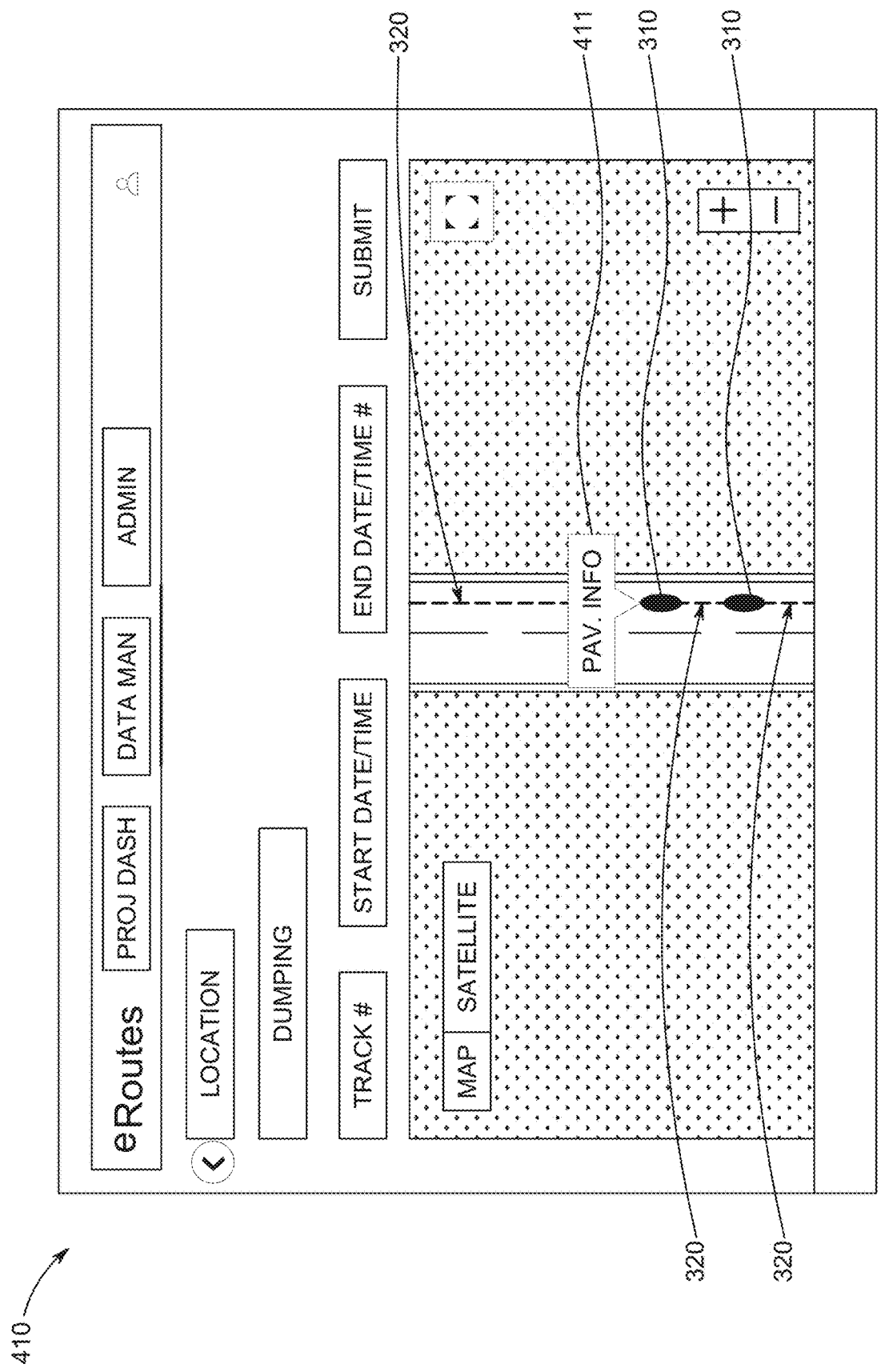
Figure 13:
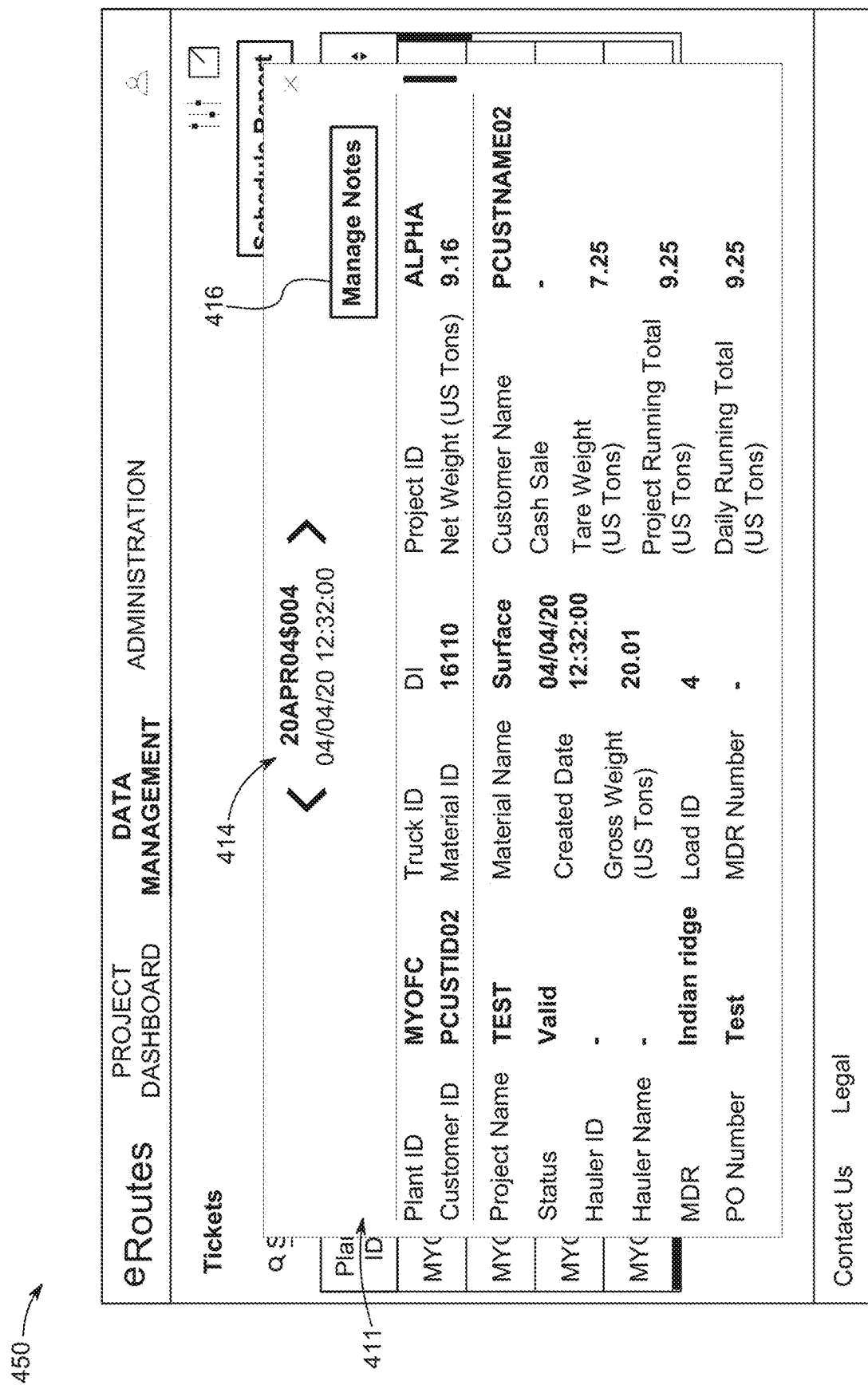
Figure 15:
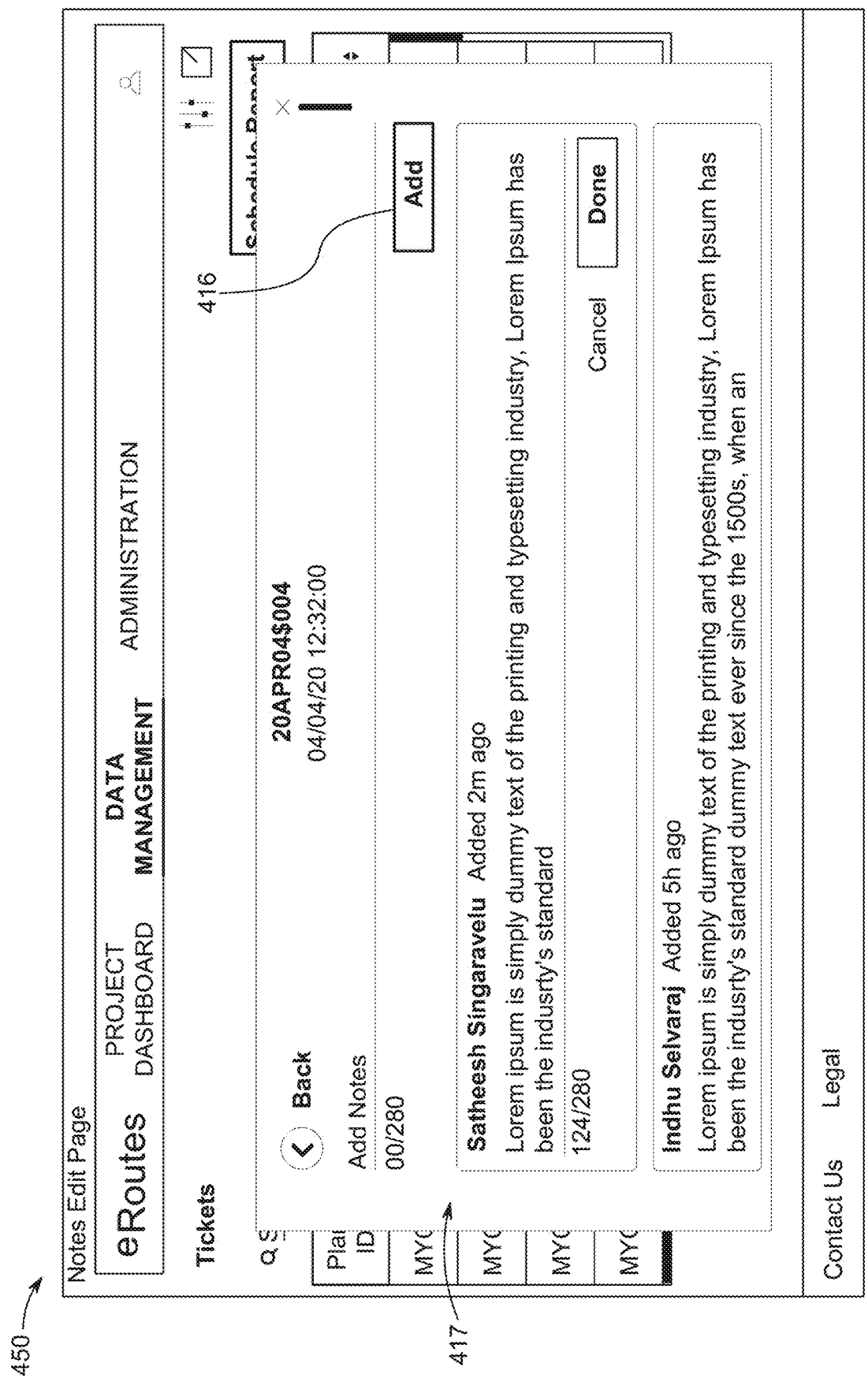
Figure 16:
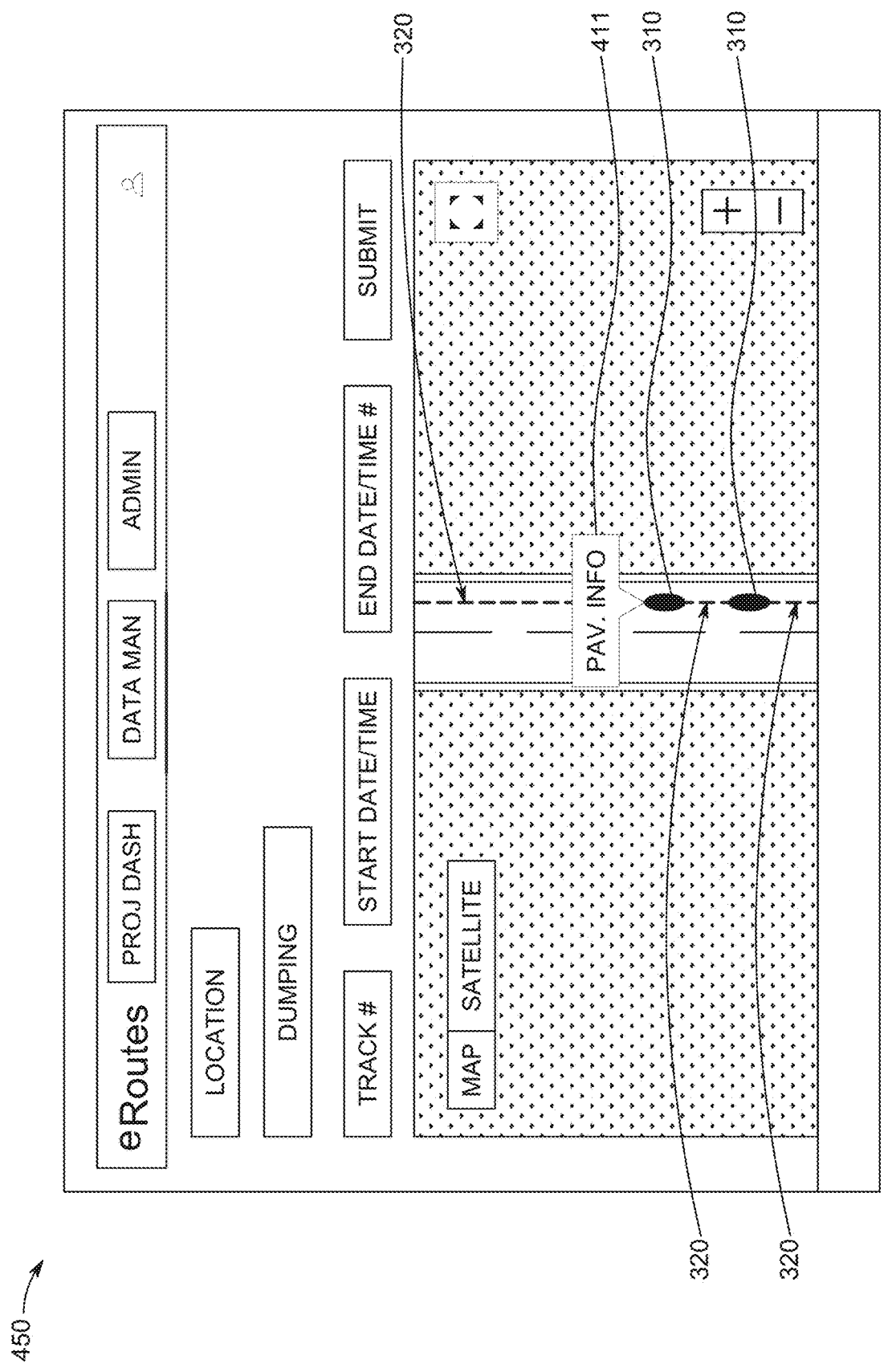

FIG. 11 shows an image of the graphical user interface 410 whereby a plurality of paving material dump spots 310. The paving material dump spots 310 may be superimposed on a map, such as shown in FIG. 11 (and/or in a non-satellite view). Each of the paving material dump spots 310 can be representative of a determined or identified paving material dump spot 310, i.e., a location at which one of the hauling machines 300 transferred paving material to the paving machine 200. Additionally or alternatively, a plurality of paving segments 320 may be provided on the map.

The paving material dump spots 310 may be identified by determining when one of the hauling machines 300 has entered the upload geofence 160 and when the hauling machine 300 has exited the upload geofence 160. According to one or more embodiments, all positions of the hauling machine 300 can be identified from an entry point to an exit point of the upload geofence 160 and a midpoint of the positions can be identified and set as a prediction of where the hauling machine 300 dumped the paving material into the paving machine 200 (i.e., paving material dump spot). Optionally, such paving material dump spot 310 identification may be performed only if the hauling machine 300 has been within the upload geofence 160 for a predetermined amount of time (e.g., 2 minutes). The back office system 160 may perform the paving material dump spot 310 identification based on information from the hauling machines 300 and the paving machine 200, particularly location information thereof. The identified paving material dump spot 310 may be automatically associated or linked to the particular electronic work ticket 305 for the particular hauling machine 300.

Figure 17:
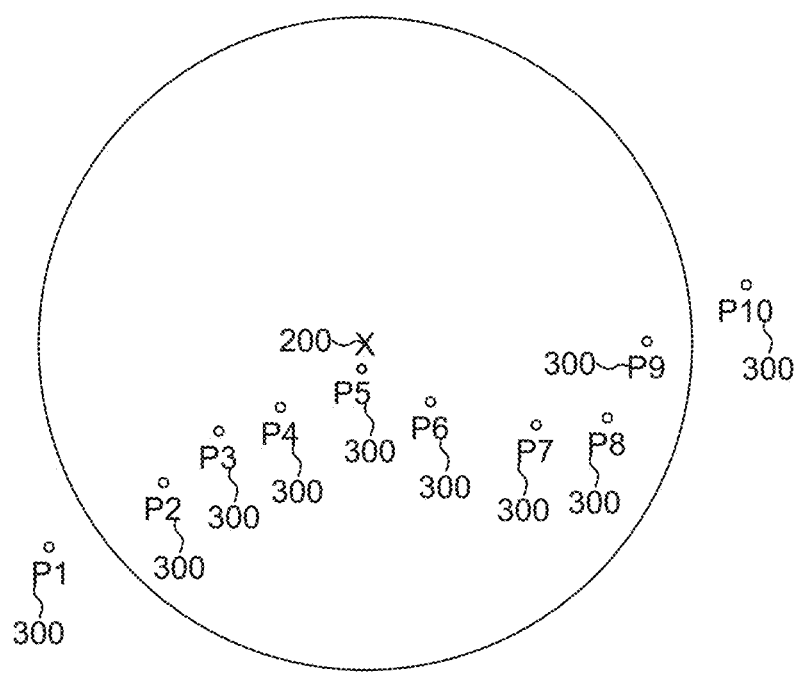
FIG. 17 is a diagram showing determination of a paving material dump spot or site according to embodiments of the disclosed subject matter.

The paving material dump spot 310 may alternatively be identified based on determining that the hauling machine 300 is within the upload geofence 160, optionally for a predetermined amount of time (e.g., 2 minutes), and then determining a closest distance of the hauling machine 300 to the paving machine 200 when the hauling machine 300 is inside the upload geofence 160. Such closest distance may be determined by a comparison of respective positions of the hauling machine 300 and the paving machine 200 by the back office system 600. FIG. 17 is a diagram showing identification of a paving material dump spot or site 310 according to embodiments of the disclosed subject matter. Notably, positions P2-P9 of the hauling machine 300 are identified within the upload geofence 160. At the same time, position information of the paving machine 200 can also be identified. Such position information can be transmitted to the back office system 600, for instance, for comparison with each of the positions P2-P9 relative to the position of the paving machine 200. A closest determined distance (e.g., P5 in this example) can be identified and set as the paving material dump spot 310. The identified paving material dump spot 310 may be automatically associated or linked to the particular electronic work ticket 305 for the particular hauling machine 300.

According to one or more embodiments, the paving material dump spot 310 may additionally or alternatively be identified by the operator of the paving machine 200. For instance, the paving machine 200 may have therein, as part of the paving machine 200 or as a portable electronic device of the operator, one of the electronic devices 400 that can run thereon a paving process application, such as described above. Incoming hauling machines 300 can be identified on a graphical user interface of a display of the electronic device 400, and when the hauling machine 300 dumps the paving material into the paving machine 200 the operator of the paving machine 300 can provide an input to the graphical user interface to record the dump location as the paving material dump spot 310. Since the hauling machine 300 is identified to the operator the mere setting of the paving material dump spot 310 can associate the paving material dump spot 310 with the electronic ticket 305 associated with the hauling machine 300.

On the other hand, it may be the case that the hauling machine 300 is not initially identified on the electronic device 400 in the paving machine 200 due to communication issues, for instance, between the hauling machine 300 and the cloud 206 and optionally the back office system 600, the paving machine 200 and the back office system 600, and/or the hauling machine 300 and the paving machine 200. In this scenario the paving material dump spot 310 can still be "manually" identified by the operator of the paving machine 200. In particular, the operator of the paving machine 200 may set a location for the paving material dump spot 310 when the hauling machine 300 dumps the paving material into the paving machine 200 and manually enter an identifier of the hauling machine 300 to associate the particular hauling machine 300 to this particular paving material dump spot 310. Since the hauling machine 300 has been associated with the electronic work ticket 305, the particular paving material dump spot 310 can also be associated with the same electronic work ticket 305.

The paving material dump spots 310 on the map may be selected via input to the graphical user interface 410. Selection of one of the paving material dump spots 310 on the map of the graphical user interface 410 may generate paving information 411 regarding the paving material dump spot 310. The paving information 411 may be displayed in a so-called pop-up icon, such as shown in FIG. 11. Optionally, some or all of the paving information (e.g., the electronic work ticket 305 identifier) 411 may be active, meaning that paving information 411 can be selected to gain more information regarding the particular electronic work ticket 305. Optionally, selection of the linked paving information 411 shown on the map may lead to paving information 411 in the form shown in FIG. 5, as an example.

The paving segments 320 on the map may be selected by input via the graphical user interface 410. Selection of one of the paving segments 320 may result in the graphical user interface 410 displaying paving progress information. The paving progress information can be based on data collected from sensor 214 and/or sensor 216 onboard the paving machine 200 that respectively sense paving width and paving depth. That is, embodiments of the disclosed subject matter can correlate paver mode of the paving machine 200 with particular paving width and/or paving depth settings (e.g., width and/or depth of screed settings) to identify when the paving machine 200 is actually paving. Such data may also be correlated with position information of the paving machine 200 to set a particular paving segment 320, specific data for which is accessible via the graphical user interface 410.

According to one or more embodiments, the paving progress information can show paving information regarding the paving width, paving depth, and/or paving distance (e.g., when the paving machine 200 is in a paving "on" mode). The paving progress data may be in the form of a cumulative total for the entire project and/or on a per-time segment, such as paving progress per day. In this regard, paving progress data may show amount of paving remaining for the entire project, or for the per-time segment. Optionally, the paving progress data may reflect an amount of remaining paving even though the per-time segment has been closed (e.g., amount of paving not completed on a particular day).

FIGS. 12-16 are images of an exemplary graphical user interface 450 that may be generated according to embodiments of the disclosed subject matter. The graphical user interface 450 can be similar to the graphical user interface 410, but may be in the non-mobile context. That is, the graphical user interface 450 may be implemented based on a non-mobile (e.g., web-based computer software program) application running on a non-mobile computer (e.g., PC) at the back office system 160, for instance.

INDUSTRIAL APPLICABILITY

As noted above, the present disclosure relates to electronically providing road servicing information, and more particularly relates to electronically providing paving information for quality and control operations. Hence, embodiments of the disclosed subject matter may not require personal, face-to-face interactions between different parties to share and assess paving information. For instance, embodiments of the disclosed subject matter can provide paving information associated with electronic work tickets 305 to different parties without the need to provide a physical work ticket.

Certain regulations (e.g., governmental and DOT) may be used to track quality of paving operations and provide control measures. Embodiments of the disclosed subject matter can provide a feature (e.g., a widget) to an application running on one or more electronic devices 400 (e.g., mobile and/or non-mobile) to provide paving information to paving quality inspector. Such paving information may be previously captured during paving operations, and may be associated with an electronic work ticket 305. For instance, embodiments of the disclosed subject matter can provide paving material dump spots 310 respectively associated with electronic work tickets 305.

Feedback may be provided regarding the provided paving information. For instance, a quality inspection/regulating entity may provide paving quality and control information to the electronic device 400, such as described above. The quality and control information may be associated with a particular electronic work ticket 305, and may be displayed on a map in association with an identified paving material dump spot 310. Moreover, optionally, the quality inspection/regulating entity may provide the quality and control information to another party (e.g., a contractor) to provide feedback or otherwise address the issue associated with the quality and control information. Thus, the feature, according to embodiments of the disclosed subject matter, can track the paving material dump spot 310, provide feedback (e.g., notes on the map) for inspection, and/or record specifics of the paving material dump spot 310 (e.g., paving material characteristics) for inspection entity verification. Optionally, the feedback may be provided for a particular paving material dump spot 310, but may not be associated with an electronic work ticket 305.

Figure 18:
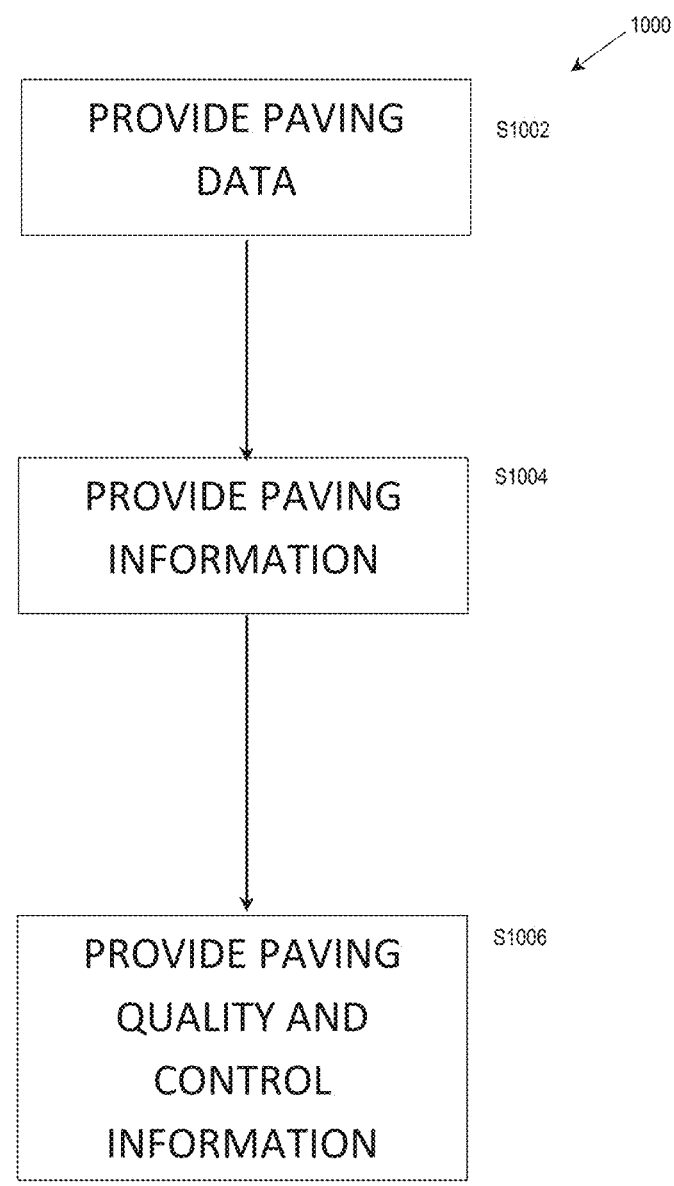
FIG. 18 is block diagram of a method according to embodiments of the disclosed subject matter.

Turning to FIG. 18, FIG. 18 is a flow chart for a method 1000 according to one or more embodiments of the disclosed subject matter. The method 1000 may be performed using a non-transitory computer-readable storage medium storing computer-readable instructions that, when executed by one or more computers, cause the one or more computers to perform the method 1000.

Method 1000 can include an operation of providing paving data, such as described above, at S1002. Such paving data can be collected by sensors of the paving machine 200 and sent from the paving machine 200 to the back office system 600, for instance. Such paving data may also be collected from sensors of the hauling machines 300.

Method 1000 can also include an operation of providing paving information, such as described above, at S1004. The paving information may be based or derived from the paving data, and may be provided from the back office system 600 to one or more of the electronic devices 400. The paving information may be associated with one or more electronic work tickets 305. Moreover, the paving information may be provided on a graphical user interface (GUI) 410/450 of the electronic device 400, which may be running a paving solutions application according to embodiments of the disclosed subject matter. As noted above, each electronic work ticket 305 may be associated with a paving material dump spot 310. The paving information may be shown on various display forms of the graphical user interface 410/450, including on one or more maps.

Method 1000 can also include an operation of providing paving quality and control information at S1006. Such paving quality and control information may be provided to the electronic device 400, for instance, by a quality inspection entity, with or without association to a particular electronic work ticket 305. The paving quality and control information may then be provided from the electronic device 400 to another electronic device 400 (e.g., of a non-quality inspection entity) and/or the back office system 600, each of which may be hosting the paving solutions application according to embodiments of the disclosed subject matter.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

The invention claimed is:

1. A quality and control system for paving operations comprising:
    a first communication circuitry of a paving machine;
    a back office system;
    a first mobile device hosting an application to perform paving quality and control operations by an operator of an authorized inspection/regulating entity;
    a first communication network accessible by and providing a communication link between the back office system and the first communication circuitry; and
    a second communication network accessible by and providing a communication link between the first mobile device and the back office system, the second communication network being a wireless communication network,
    wherein the back office system provides to the first mobile device paving information regarding electronic work tickets associated with respective paving material dump spots at a worksite,
    wherein the application hosted on the first mobile device provides a graphical user interface (GUI) on a display of the first mobile device to selectively display portions of the paving information corresponding to a specific one of the electronic work tickets responsive to an input at the graphical user interface from the operator of the authorized inspection/regulating entity requesting the paving information for the specific one of the electronic work tickets,
    wherein the first mobile device provides to the back office system paving quality and control information input by the operator of the authorized inspection/regulating entity using the graphical user interface provided by the application hosted on the first mobile device, and
    wherein the paving machine provides paving data to a second mobile device hosting the application, via the first communication circuitry, the first communication network, and the back office system, based on data from sensors of the paving machine regarding paving thickness and/or paving width when the paving machine is in a paving mode "on" status, the paving data being provided on a map of a graphical user interface of the second mobile device and representative of paving progress.

2. The quality and control system according to claim 1, wherein the paving information includes, for each of the paving material dump spots, location of the paving material dump spot, a date and time of creation of the paving material dump spot, an electronic ticket identifier, a haul truck identifier, a customer identifier associated with the haul truck, a paving material identifier, a paving material plant identifier associated with the paving material, and/or a weight of the paving material provided at the paving material dump spot.

3. The quality and control system according to claim 1, wherein the paving information is provided on a map on the display responsive to the input at the graphical user interface from the operator of the authorized inspection/regulating entity requesting the paving information for the specific one of the electronic work tickets.

4. The quality and control system according to claim 1, wherein the paving quality and control information provided from the first mobile device to the back office system is a characterization of the paving operation at one or more of the paving material dump spots.

5. The quality and control system according to claim 1, wherein the paving quality and control information provided from the first mobile device to the back office system includes a requirement for additional information and/or an action to be taken at one or more of the paving material dump spots.

6. The quality and control system according to claim 1, wherein the dump spots are respectively associated with the electronic work tickets responsive to identification of the dump spots.

7. The quality and control system according to claim 6, wherein each of the dump spots is identified based on determination of a corresponding haul truck being within a virtual boundary around the paving machine and a closest determined distance of the haul truck to the paving machine within the virtual boundary, from among a plurality of determined distances of the haul truck to the paving machine within the virtual boundary, and/or operator input to an electronic device within the paving machine that also hosts the application, wherein the operator input identifies the haul truck and associates the haul truck with the dump spot.

8. An inspection method comprising:
receiving paving information at a first mobile device hosting an application to perform paving quality and control operations, the paving information including a bundle of electronic work tickets associated with respective paving material dump spots;
providing, using the application hosted on the first mobile device, a graphical user interface (GUI) on a display of the first mobile device to selectively display portions of the paving information responsive to user input at the graphical user interface; and
recording, using the application hosted on the first mobile device, paving quality and control information responsive to user input to the graphical user interface,
wherein the paving quality and control information includes a requirement for additional information and/or a requirement for action to be taken at one or more of the paving material dump spots,
wherein the paving information includes paving progress information based on paving data from sensors of a paving machine regarding paving thickness and/or width when the paving machine is in a paving mode "on" status, and
wherein the inspection method further comprises providing, on a map on the graphical user interface on the display of the first mobile device, the paving progress information.

9. The inspection method according to claim 8, further comprising outputting, from the first mobile device, the paving quality and control information over a communication network to a back office system.

10. The inspection method according to claim 8,
wherein the dump spots are respectively associated with the electronic work tickets responsive to identification of the paving material dump spots, and
wherein each of the paving material dump spots is identified based on determination of a corresponding haul truck being within a geofence around the paving machine and a closest determined distance of the haul truck relative to the paving machine, from among a plurality of determined distances of the haul truck relative to the paving machine.

11. The inspection method according to claim 8,
wherein the paving material dump spots are respectively associated with the electronic work tickets responsive to identification of the paving material dump spots, and
wherein each of the paving material dump spots is identified based on operator input to an electronic device of the paving machine that also hosts the application, wherein the operator input associates a haul truck with the paving material dump spot.

12. The inspection method according to claim 8, further comprising outputting, from the first mobile device, using the application hosted on the first mobile device, the paving quality and control information over a communication network to a back office system,
wherein said recording the paving quality and control information includes electronically capturing an image of the paving material and/or a temperature of the paving material, and outputting data corresponding to the electronically captured image and/or temperature as part of the paving quality and control information output to the back office system.

13. A non-transitory computer-readable storage medium storing computer-readable instructions that, when executed by one or more computers, cause the one or more computers to perform a method comprising:
receiving paving information at a first computer of the one or more computers, which is hosting an application to perform paving quality and control operations, the paving information including one or more electronic work tickets linked to respective paving material dump spots;
providing, using the application hosted on the first computer, a graphical user interface (GUI) on a display to display the paving information responsive to an input at the graphical user interface;
receiving, using the application hosted on the first computer, paving quality and control information responsive to input to the graphical user interface; and
receiving, at a second computer of the one or more computers of a back office system, paving data from sensors of a paving machine regarding paving thickness and/or paving width when the paving machine is in a paving mode "on" state; and outputting paving progress information involving a plurality of the paving material dump spots, on a map provided on a display device associated with the first computer,
wherein the paving quality and control information is a characterization of paving material at one or more of the paving material dump spots, and
wherein the paving information includes a location of the paving material dump spot, a date and time of creation of the paving material dump spot, an electronic ticket identifier, a haul truck identifier, a customer identifier associated with the haul truck, a paving material identifier, a paving material plant identifier associated with the paving material, and/or a weight of the paving material provided at the paving material dump spot.

14. The non-transitory computer-readable storage medium non-transitory computer-readable storage medium according to claim 13, further comprising outputting, from the first computer, using the application hosted on the first computer, the paving quality and control information over a communication network to the back office system having a second computer of the one or more computers.

15. The non-transitory computer-readable storage medium non-transitory computer-readable storage medium according to claim 13, further comprising respectively linking the electronic work tickets to the paving material dump spots, said linking including identifying the paving material dump spots, said identifying the paving material dump spots including either determining a closest determined distance of the haul truck to the paving machine, from among a plurality of determined distances of the haul truck to the paving machine, or receiving operator input to an electronic device in the paving machine that also hosts the application, the operator input providing an identifier for the haul truck and associating the haul truck with the paving material dump spot.

16. The non-transitory computer-readable storage medium non-transitory computer-readable storage medium according to claim 13, further comprising electronically capturing, using a mobile device running the application, characteristics of the paving material, data corresponding to electronically captured characteristics being output from the mobile device as part of the paving quality and control information.

17. The non-transitory computer-readable storage medium non-transitory computer-readable storage medium according to claim 13, wherein the paving quality and control information sets a flag regarding status of paving material at the one or more of the paving material dump spots, each said flag being removable only by a same entity that issues the flag.

* * * * *